United States Patent
Han et al.

(10) Patent No.: US 9,485,458 B2
(45) Date of Patent: Nov. 1, 2016

(54) DATA PROCESSING METHOD AND DEVICE

(71) Applicants: Beijing Lenovo Software Ltd., Beijing (CN); Lenovo (Beijing) Co., Ltd., Beijing (CN)

(72) Inventors: Yu Han, Beijing (CN); Xiaobing Guo, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 28 days.

(21) Appl. No.: 14/229,865

(22) Filed: Mar. 29, 2014

(65) Prior Publication Data

US 2015/0054909 A1    Feb. 26, 2015

(30) Foreign Application Priority Data

Aug. 20, 2013  (CN) .......................... 2013 1 0364449

(51) Int. Cl.
*H04N 7/14*  (2006.01)

(52) U.S. Cl.
CPC .................................... *H04N 7/141* (2013.01)

(58) Field of Classification Search
None
See application file for complete search history.

(56) References Cited

U.S. PATENT DOCUMENTS

| | | | | |
|---|---|---|---|---|
| 2003/0041333 A1* | 2/2003 | Allen | ...................... | H04N 5/76 725/106 |
| 2007/0126861 A1* | 6/2007 | Kim | ................... | H04M 7/0072 348/14.02 |
| 2007/0195158 A1* | 8/2007 | Kies | ..................... | H04L 65/604 348/14.01 |
| 2010/0097440 A1* | 4/2010 | Lee | ....................... | H04N 7/147 348/14.02 |
| 2011/0249079 A1* | 10/2011 | Santamaria | ......... | H04M 7/0057 348/14.02 |
| 2012/0114108 A1* | 5/2012 | Katis | ................... | H04L 12/5895 379/88.13 |

* cited by examiner

*Primary Examiner* — Maria El-Zoobi
(74) *Attorney, Agent, or Firm* — Harness, Dickey & Pierce, P.L.C.

(57) ABSTRACT

A data processing method and a device are provided. The method includes: sending, by a first communication device, a video communication request to a second communication device; receiving a first response identifier corresponding to the video communication request, where the first response identifier is adapted to identify that the first communication device fails to communicate with the second communication device in response to the video communication request; and collecting message information according to the first response identifier and transmitting the message information to the second communication device. The type of the message information is one of video message information, audio message information, text message information and picture message information.

18 Claims, 2 Drawing Sheets

DATA PROCESSING METHOD AND DEVICE

This application claims the priority to Chinese Patent Application No. 201310364449.1, entitled "DATA PROCESSING METHOD AND DEVICE", filed with the Chinese Patent Office on Aug. 20, 2013, which is incorporated by reference in its entirety herein.

FIELD

The present disclosure relates to the field of communication, and in particular to a data processing method and a device.

BACKGROUND

With a continuous development of the communication technology, a convenient communication way is provided for a user. The user may communicate with others at anytime and anywhere by multiple ways, such as text, voice and video. The text communication may mainly be implemented by communicating with others by text message. The voice communication may include an audio message and an audio call. The video communication may include a video message and a video call. The video communication has a good communication experience for allowing users to chat face to face, and is often preferred by the user. In the situation that there are a variety of communication ways, a data processing becomes a key to provide high quality communication services for the users.

In an existing data processing method, a first communication device obtains a communication request initiated to a second communication equipment, in a video call; the first communication device judges whether a communication connection between the first communication device and the second communication device can be established; if the communication connection can be established between the first communication device and the second communication device, the first communication device can perform a video communication with the second communication device; if the communication connection cannot be established between the first communication device and the second communication device, the first communication device cannot perform the video communication with the second communication device, and the communication process ends. In this case, if the user of the first communication device expects to select other communication ways such as a text message, an audio message or a video message, the user need to manually select the way of leaving a message, which can be provided by the first communication device. After the user selects the way of leaving a message, the first communication device can provide the corresponding communication service to the user.

In the process for implementing the data processing method, at least the following problems in the existing technology are found.

In the process of data processing in the existing technology, when it is detected that the communication connection between the first communication device and the second communication device fails to be established, the first communication device cannot perform a communication with the second communication device and the communication process ends. Then, the user need to manually select the way of leaving a message, and thus the corresponding communication service may be continued. Therefore, a convenient and quick communication service cannot be provided for the user.

SUMMARY

In order to solve the problems, a data processing method and a device are provided according to embodiments of the disclosure. The technical solutions are as follows.

In one aspect, a data processing method is provided, which is applied to a first communication device. The method includes:

sending, by the first communication device, a video communication request to a second communication device;

receiving a first response identifier corresponding to the video communication request, wherein the first response identifier is adapted to identify that the first communication device fails to communicate with the second communication device in response to the video communication request; and collecting message information according to the first response identifier and transmitting the message information to the second communication device;

wherein the type of the message information is one of video message information, audio message information, text message information and picture message information.

Preferably, the first response identifier is adapted to identify that the first communication device fails to communicate with the second communication device in response to the video communication request, includes:

the first response identifier is adapted to identify that the video communication request is not successfully sent to the second communication device, the first communication device does not receive an acceptance response to the video communication request from the second communication device in a predetermined period, or the first communication device receives a rejection response to the video communication request from the second communication device.

Preferably, at least two types of cases where the first communication device fails to communicate with the second communication device in response to the video communication request correspond to different values of the first response identifier;

the collecting message information according to the first response identifier includes:

collecting the message information in a first way in the case where the value of the first response identifier is a first value; and collecting the message information in a second way in the case where the value of the first response identifier is a second value; and the first way is different from the second way.

Preferably, the first way and the second way are different in a collecting parameter and/or a message information parameter.

Preferably, a first type of the case where the first communication device fails to communicate with the second communication device in response to the video communication request is that the first communication device does not receive an acceptance response to the video communication request from the second communication device in a predetermined period, and a second type of the case where the first communication device fails to communicate with the second communication device in response to the video communication request is that the first communication device receives a rejection response to the video communication request from the second communication device;

the message information collected in the two types of the cases where the first communication device fails to communicate with the second communication device in response to the video communication request has the same type, and times for recording the message information collected in the two types are different; or the message information collected in the two types of the cases where the first communication device fails to communicate with the second communication device in response to the video communication request has a different type, the message information collected in the second type of the case where the first communication device fails to communicate with the second communication device in response to the video communication request corresponds to a first output region when being played, the message information collected in the first type of the case where the first communication device fails to communicate with the second communication device in response to the video communication request corresponds to a second output region when being played, and the first output region is smaller than the second output region.

Preferably, a first type of the case where the first communication device fails to communicate with the second communication device in response to the video communication request is that the first communication device does not receive an acceptance response to the video communication request from the second communication device in a predetermined period, or that the first communication device receives a rejection response to the video communication request from the second communication device; and a second type of the case where the first communication device fails to communicate with the second communication device in response to the video communication request is that the video communication request is not successfully sent to the second communication device;

the sending, by the first communication device, a video communication request to a second communication device includes:

sending, by the first communication device, the video communication request to the second communication device by using a first application;

the collecting message information according to the first response identifier and transmitting the message information to the second communication device includes:

collecting the message information by using the first application and transmitting the message information to the second communication device, in the case of the first type of the case where the first communication device fails to communicate with the second communication device in response to the video communication request; and collecting the message information by using a second application and transmitting the message information to the second communication device, in the case of the second type of the case where the first communication device fails to communicate with the second communication device in response to the video communication request;

wherein the first application is different from the second application.

Preferably, the collecting message information according to the first response identifier and transmitting the message information to the second communication device includes:

collecting the message information in a timely manner according to the first response identifier, generating a data file from the message information and transmitting the data file to the second communication device; or collecting the message information in a timely manner according to the first response identifier and directly transmitting the message information to the second communication device, wherein the second communication device generates a data file from the message information.

Preferably, after the sending, by the first communication device, a video communication request to a second communication device, the method further includes:

receiving a second response identifier corresponding to the video communication request, wherein the second response identifier is adapted to identify that the first communication device succeeds to communicate with the second communication device in response to the video communication request; and detecting a communication quality of a network with the first communication device according to the second response identifier, establishing a connection between the first communication device and the second communication device according to the communication quality and performing a communication data transmission.

Preferably, the establishing a connection between the first communication device and the second communication device according to the communication quality and performing a communication data transmission includes:

establishing a video communication connection between the first communication device and the second communication device and transmitting video communication data, in the case where it is detected that the communication quality is greater than or equal to a preset condition; and establishing an audio communication connection between the first communication device and the second communication device and transmitting audio communication data, in the case where it is detected that the communication quality is less than the preset condition.

Preferably, before the establishing an audio communication connection between the first communication device and the second communication device, the method further includes:

displaying an option of an audio communication request initiated to the second communication device, and obtaining the audio communication request initiated to the second communication device after a user selects the option of the audio communication request;

the establishing an audio communication connection between the first communication device and the second communication device includes:

establishing the audio communication connection between the first communication device and the second communication device according to the obtained audio communication request.

Preferably, after the establishing a connection between the first communication device and the second communication device according to the communication quality, the method further includes:

saving communication data sent by the second communication device as the message information if the first communication device does not obtain the communication data, and playing the saved message information after the first communication device obtains the communication data.

In another aspect, a communication device is further provided. The communication device includes:

a sending module adapted to send a video communication request to a second communication device;

a first receiving module adapted to receive a first response identifier corresponding to the video communication request, wherein the first response identifier is adapted to identify that the first communication device fails to communicate with the second communication device in response to the video communication request;

a collecting module adapted to collect message information according to the first response identifier; and a transmission module adapted to transmit the message information to the second communication device; wherein the type of the message information is one of video message information, audio message information, text message information and picture message information.

Preferably, the first response identifier received by the first receiving module is adapted to identify that the video communication request is not successfully sent to the second communication device, that the first communication device does not receive an acceptance response to the video communication request from the second communication device in a predetermined period, or that the first communication device receives a rejection response to the video communication request from the second communication device.

Preferably, at least two types of cases where the first communication device fails to communicate with the second communication device in response to the video communication request correspond to different values of the first response identifier;

the collecting module is adapted to collect the message information in a first way in the case where the value of the first response identifier is a first value; and collect the message information in a second way in the case where the value of the first response identifier is a second value; and the first way is different from the second way.

Preferably, the first way and the second way, in which the message information is collected, are different in a collecting parameter and/or a message information parameter.

Preferably, a first type of the case where the first communication device fails to communicate with the second communication device in response to the video communication request is that the first communication device does not receive an acceptance response to the video communication request from the second communication device in a predetermined period, and a second type of the case where the first communication device fails to communicate with the second communication device in response to the video communication request is that the first communication device receives a rejection response to the video communication request from the second communication device;

the message information collected in the two types of the cases where the first communication device fails to communicate with the second communication device in response to the video communication request has the same type, and the times for recording the message information collected in the two types are different; or the message information collected in the two types of the cases where the first communication device fails to communicate with the second communication device in response to the video communication request has a different type, the message information collected in the second type of the case where the first communication device fails to communicate with the second communication device in response to the video communication request corresponds to a first output region when being played, the message information collected in the first type of the case where the first communication device fails to communicate with the second communication device in response to the video communication request corresponds to a second output region when being played, and the first output region is smaller than the second output region.

Preferably, a first type of the case where the first communication device fails to communicate with the second communication device in response to the video communication request is that the first communication device does not receive an acceptance response to the video communication request from the second communication device in a predetermined period, or that the first communication device receives a rejection response to the video communication request from the second communication device; and a second type of the case where the first communication device fails to communicate with the second communication device in response to the video communication request is that the video communication request is not successfully sent to the second communication device;

the sending module is adapted to send the video communication request to the second communication device by using a first application;

the collecting module is adapted to collect the message information by using the first application, the transmission module is adapted to transmit the message information to the second communication device, in the case of the first type of the case where the first communication device fails to communicate with the second communication device in response to the video communication request; and the collecting module is adapted to collect the message information by using a second application, the transmission module is adapted to transmit the message information to the second communication device, in the case of the second type of the case where the first communication device fails to communicate with the second communication device in response to the video communication request;

wherein the first application is different from the second application.

Preferably, the collecting module is adapted to collect the message information in a timely manner according to the first response identifier, generate a data file from the message information; and the transmission module is adapted to transmit the data file to the second communication device; or the collecting module is adapted to collect the message information in a timely manner according to the first response identifier, and the transmission module is adapted to directly transmit the message information to the second communication device, wherein the second communication device generates a data file from the message information.

Preferably, the device further includes:

a second receiving module adapted to receive a second response identifier corresponding to the video communication request, wherein the second response identifier is adapted to identify that the first communication device succeeds to communicate with the second communication device succeed in response to the video communication request;

a detection module adapted to detect a communication quality of a network with the first communication device according to the second response identifier; and a data transmission module adapted to establish a connection between the first communication device and the second communication device according to the communication quality and transmit communication data.

Preferably, the data transmission module is adapted to establish a video communication connection between the first communication device and the second communication device and transmit video communication data in the case where it is detected that the communication quality is greater than or equal to a preset condition; and establish an audio communication connection between the first communication device and the second communication device and transmit audio communication data in the case where it is detected that the communication quality is less than the preset condition.

Preferably, the device further includes:

a display module adapted to display an option of an audio communication request initiated to the second communication device;

a obtaining module adapted to obtain the audio communication request initiated to the second communication device after a user selects the option of the audio communication request; and the data transmission module adapted to establish the audio communication connection between the first communication device and the second communication device according to the obtained audio communication request.

Preferably, the device further includes:

a saving module adapted to save communication data sent by the second communication device as the message information if the first communication device does not obtain the communication data; and a playing module adapted to play the saved message information after the first communication device obtains the communication data.

The advantageous effects of the technical solutions according to the embodiments of the disclosure are as follows.

A first communication device sends a video communication request to a second communication device, and sends to the second communication device the message information collected according to a first response identifier in the case where the identifier for identifying that the first communication device fails to communicate with the second communication device in response to the video communication request is received. Therefore, the first communication device is still capable of continuously sending the message information to the second communication device, when the first communication device cannot perform a video communication with the second communication device. Thus, a quick and convenient selection among a variety of communication ways such as video communication, a video message, and an audio message is achieved and faster communication service is provided for the user.

BRIEF DESCRIPTION OF THE DRAWINGS

In order to more clearly illustrate the technical solutions in embodiments of the disclosure, in the following, accompanying drawings referred to describe the embodiments are introduced simply. Obviously, the accompanying drawings in the following description are just some embodiments recited in the disclosure. For those skilled in the art, other accompanying drawings can also be obtained based on these accompanying drawings provided herein without any creative work.

DETAILED DESCRIPTION OF THE EMBODIMENTS

To make the object, features and advantages of the present disclosure clearer, embodiments of the present disclosure are described in detail in conjunction with the accompanying drawings hereinafter.

First Embodiment

Figure 1:
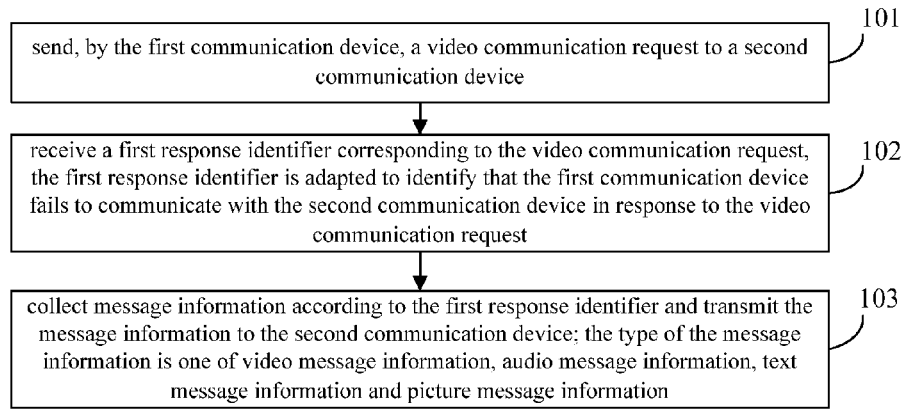
FIG. 1 is a flowchart of a data processing method according to a first embodiment of the disclosure.

The embodiment of the present disclosure provides a data processing method, which is applied in a first communication device. Referring to FIG. 1, the flowchart of the method includes Steps 101 to 103.

101: the first communication device sends a video communication request to a second communication device.

102: the first communication device receives a first response identifier corresponding to the video communication request. The first response identifier is adapted to identify that the first communication device fails to communicate with the second communication device in response to the video communication request.

103: the first communication device collects message information according to the first response identifier and transmits the message information to the second communication device. The type of message information is one of video message information, audio message information, text message information and picture message information.

With the method according to the embodiment of the present disclosure, a first communication device sends a video communication request to a second communication device, and sends to the second communication device the message information collected according to a first response identifier in the case where the identifier for identifying that the first communication device fails to communicate with the second communication device in response to the video communication request is received. Therefore, the first communication device is still capable of continuously sending the message information to the second communication device, when the first communication device cannot perform a video communication with the second communication device. Thus, a quick and convenient selection among a variety of communication ways such as video communication, a video message and an audio message is achieved, and faster communication service is provided for the user.

Second Embodiment

Figure 2:
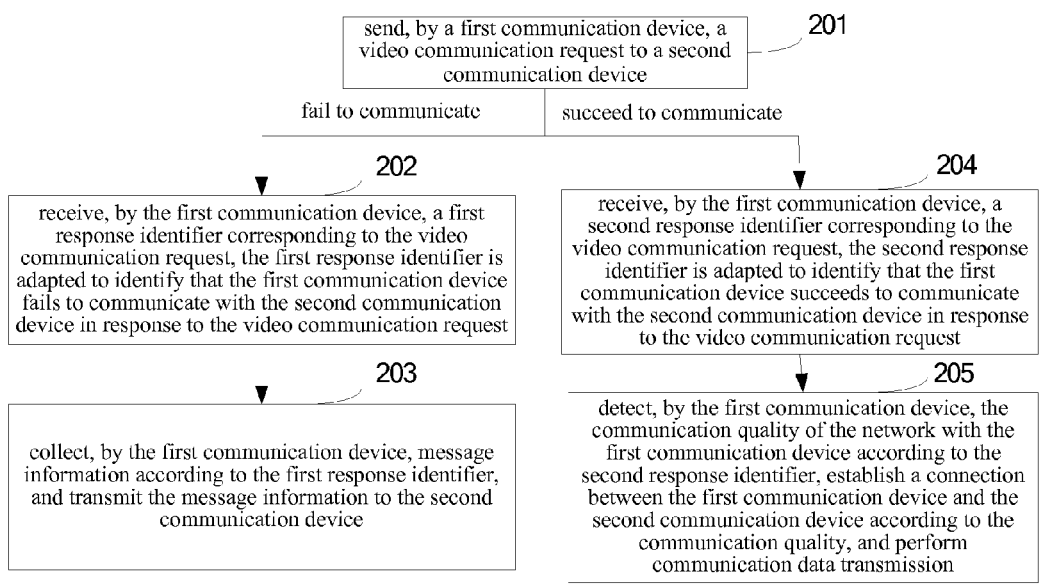
FIG. 2 is a flowchart of a data processing method according to a second embodiment of the disclosure.

The embodiment of the disclosure provides a data processing method, which can provide convenient and quick communication ways for a user when the two communication devices fail to communicate with each other in response to the video communication request. The embodiment of the disclosure is illustrated only by taking the example of the method being applied to the first communication device, and the first communication device initiates a video communication request to the second communication device. Referring to FIG. 2, combined with the above-mentioned first embodiment, the flowchart of the method includes Steps 201 to 205.

201: the first communication device sends a video communication request to the second communication device, Step 202 is performed if the first communication device fails to communicate with the second communication device, and Step 204 is performed if the first communication device succeeds to communicate with the second communication device.

In this step, the way for sending the video communication request from the first communication device to the second communication device is not limited in the embodiment, and which second communication device the first communication device sends the video communication request to is not limited either. In a preferred embodiment, multiple identifiers of the second communication devices may be displayed on a screen of the first communication device. After the user selects one of the second communication devices, option of a video communication request initiated to the selected second communication device is displayed. After the user selects the option of the video communication request initiated to the second communication device, the first communication device obtains the video communication request initiated to the corresponding second communication device, and sends the video communication request to the second communication device.

Figure 3:
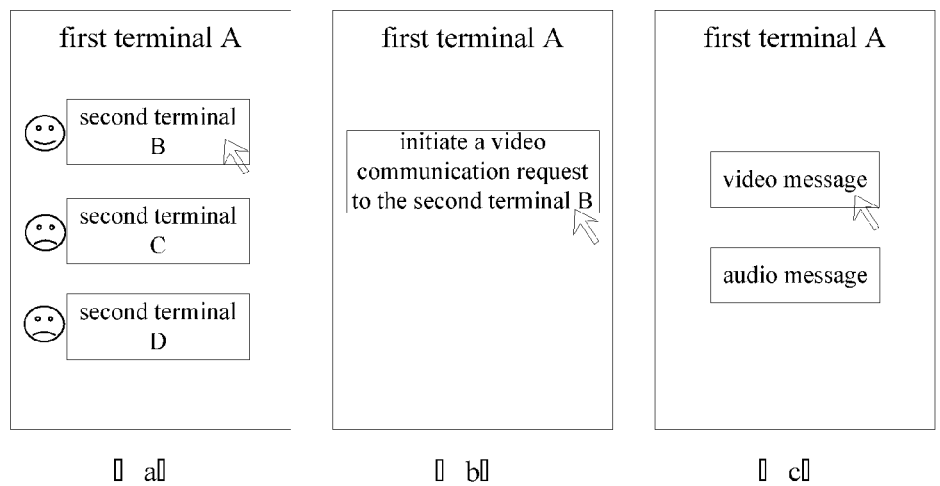
FIG. 3 is a schematic diagram of an display interface of a video call according to the second embodiment of the disclosure.

For example, the identifiers of the second communication devices B, C and D are displayed in the first communication device A, as illustrated in FIG. 3(a). After the user selects the second communication device B, the option of a video communication request initiated to the second communication device B is displayed, as illustrated in FIG. 3(b). After the user selects the option of the video communication request initiated to the second communication device B, the first communication device A obtains the video communication request initiated to the second communication device B and sends the video communication request to the communication device B.

In a particular implementation, the first communication device is connected to a server, and an identifier of the second communication device is carried in the video communication request obtained by the first communication device. After obtaining the video communication request initiated to the second communication device, the first communication device may further send the video communication request initiated to the second communication device to the server, and the server sends the video communication request to the second communication device corresponding to the identifier of the second communication device which is carried in the video communication request. Alternatively, besides the way of sending the video communication request to the second communication device via the server, the first communication device may send the video communication request directly to the second communication device. The way of sending the video communication request from the first communication device to the second communication device is not particularly limited in the embodiment.

Step 202 is performed, if the video communication request is successfully sent to the second communication device, and the first communication device succeeds communicate with and the second communication device. Step 204 is performed, if the video communication request is not successfully sent to the second communication device, or the video communication request is successfully sent to the second communication device but no response is provided by the second communication device, i.e. the first communication device fails to communicate with the second communication device.

202: the first communication device receives a first response identifier corresponding to the video communication request. The first response identifier is adapted to identify that the first communication device fails to communicate with the second communication device in response to the video communication request.

In this step, there are many ways of the first communication device receiving the first response identifier corresponding to the video communication request, including but not limited to the first communication device receiving the returned first response identifier via a an intermediate device, such as a server, in the case where the first communication device fails to establish a network connection with the second communication device, or in the case where the second communication device receives the video communication request, but the user of the second communication device does not response to the video communication request, and thus the second communication device does not return an acceptance respond to the first communication device. No matter what way of the first communication device receiving the first response identifier, the first response identifier for identifying that the first communication device fails to communicate with the second communication device in response to the video communication request, includes:

the first response identifier for identifying that the video communication request is not successfully sent to the second communication device, that the first communication device does not receive an acceptance response to the video communication request from the second communication device, or that the first communication device receives a rejection response to the video communication request from the second communication device.

203: the first communication device collects message information according to the first response identifier, and transmits the message information to the second communication device, and then the process is over.

In this step, there are many types of cases where the first communication device fails to communicate with the second communication device in response to the video communication request, which will not be limited particularly in the embodiment. At least two types of the cases where the first communication device fails to communicate with the second communication device in response to the video communication request correspond to different values of the first response identifier. Therefore, the step of collecting the message information according to the first response identifier includes but is not limited to the following:

collecting the message information in a first way in the case where the value of the first response identifier is a first value; and collecting the message information in a second way in the case where the value of the first response identifier is a second value; the first way is different from the second way.

The first way and the second way are different in, but not limited to, a collecting parameter and/or a message information parameter.

The collecting parameter includes, but is not limited to, a duration of collecting. The message information parameter includes, but is not limited to, the type of collected message information. The collecting parameter and the message information parameter are not limited particularly in the embodiment. The type of collected message information includes but is not limited to one of video message information, audio message information, text message information and picture message information.

Furthermore, the case where the first communication device fails to communicate with the second communication device in response to the video communication request includes two types. The first type is that the first communication device does not receive an acceptance response to the video communication request from the second communication device in a predetermined period. The second type is that the first communication device receives a rejection response to the video communication request from the second communication device.

For the above-mentioned two types, the message information collected in the two types of the cases where the first communication device fails to communicate with the second communication device in response to the video communication request has the same type, and times for recording the message information collected in the two types are different;

Alternatively, the message information collected in the two types of the cases where the first communication device fails to communicate with the second communication device in response to the video communication request has a different type. The message information collected in the second type of the case where the first communication device fails to communicate with the second communication device in response to the video communication request corresponds to a first output region when being played, and the message information collected in the first type of the case where the first communication device fails to communicate with the second communication device in response to the video communication request corresponds to a second output region when being played. The first output region is smaller than the second output region. The second type of the case where the first communication device fails to communicate with the second communication device in response to the video communication request is that the first communication device receives a rejection response to the video communication request from the second communication device, and the rejection respond may be triggered by the user in a inconvenient time such as during a meeting. Thus, message information containing audio should be avoided to be employed in the collected message information, i.e., only to employ message information without audio information, which can only be seen on the screen by the user. In contrast to the message information without audio information, the message information with audio information can be listened in a certain space, and the space for listening in the audio is bigger than the space for seeing message information without audio. Therefore when being played, the first output region corresponding to the message information collected in the second type of the case that the first communication device fails to communicate with the second communication device in response to the video communication request is smaller than the second output region corresponding to the message information collected in the first type.

Alternatively, a first type of the case where the first communication device fails to communicate with the second communication device in response to the video communication request is that the first communication device does not receive an acceptance response to the video communication request from the second communication device in a predetermined period or that the first communication device receives a rejection response to the video communication request from the second communication device. A second type of the case where the first communication device fails to communicate with the second communication device in response to the video communication request is that the video communication request is not successfully sent to the second communication device.

The sending, by the first communication device, a video communication request to the second communication device includes:

sending, by the first communication device, a video communication request to the second communication device by using a first application.

The step of collecting the message information according to the first response identifier and transmitting the message information to the second communication device includes:

collecting the message information by using the first application and transmitting the message information to the second communication device, in the case of the first type of the case where the first communication device fails to communicate with the second communication device in response to the video communication request;

collecting the message information by using a second application and transmitting the message information to the second communication device, in the case of the second type of the case where the first communication device fails to communicate with the second communication device in response to the video communication request.

The first application is different from the second application, and the types of application the first application and the second application are not limited in the embodiment.

Furthermore, the step of collecting the message information according to the first response identifier and transmitting the message information to the second communication device includes:

collecting the message information in a timely manner according to the first response identifier, generating a data file from the message information, and transmitting the data file to the second communication device; or collecting the message information in a timely manner according to the first response identifier, transmitting the message information to the second communication device directly. The second communication device generates a data file from the message information.

In particular, no matter which type of the case where the first communication device fails to communicate with the second communication device in response to the video communication request, the step of collecting, by the first communication device, the message information includes but is not limited to: displaying an option of message, and collecting the message information after the user selects the option of message.

For example, as illustrated in FIG. 3(c), after the first communication device A receives the first response identifier, the option of video message and the option of audio message are displayed. After the user selects the option of the video message, the video message information corresponding to the option of the video message is collected. When the video message information is collected, the first communication device may be provided itself or connected peripherally with a video tool such as a camera. Furthermore, the first communication device may be provided itself or connected peripherally with voice recording tool such as a microphone, which may be adapted to collect voice message information. The particular way for collecting the message information is not limited in the embodiment of the disclosure.

After collecting the message information, the first communication device transmits the message information to the second communication device by, but is not limited by, sending the message information to a server, carrying an identifier of the second communication device in the message information, and sending, by the server, the message information to the second communication device according to the identifier of the second communication device. Alternatively, the first communication device may also send the collected message information to the second communication device directly. The way of sending the message information from the first communication device to the second communication device is not limited in the embodiment.

204: The first communication device receives a second response identifier corresponding to the video communication request. The second response identifier is adapted to identify that the first communication device succeeds to communicate with the second communication device in response to the video communication request.

In this step, there are many ways of the first communication device receiving the second response identifier corresponding to the video request, which includes, but not limited to, the following: when a network connection is established between the first communication device and the second communication device, the second communication device receives the video communication request, the user of the second communication device accepts the video communication request, and then the second communication device returns a second response identifier to the first communication device; or the second communication device returns the determination respond to the intermediate device such as a server and the intermediate device such as the server returns the second determination respond to the first communication device. No matter what way the first communication device receives the second response identifier, the second response identifier is adapted to identify that the first communication device succeeds to communicate with the second communication device in response to the video communication request.

205: the first communication device detects the communication quality of the network with the first communication device according to the second response identifier, establishes a connection with the second communication device according to the communication quality, and performs a communication data transmission.

In this step, to ensure the communication quality, the first communication device is applied to the method according to the embodiment, to detect the communication quality of the network with the first communication device according to the second response identifier, establish a connection between the first communication device and the second communication device according to the communication quality, and perform the communication data transmission. In a particular implementation, the method for detecting, by the first communication device, the communication quality of the network with the first communication device according to the second response identifier is not limited in the embodiment, which includes but not limited to detecting a bandwidth of data transmission, a data transmission delay and a packet loss ratio, and so on. Due to the different communication quality requirement for different types of call, the method for establishing a connection between the first communication device and the second communication device according to the communication quality and performing the communication data transmission includes but is not limited to:

when the detected communication quality is greater than or is equal to the predetermined condition, establishing a video communication connection between the first communication device and the second communication device according to the communication quality, and performing a video communication data transmission; and when the detected communication quality is less than the predetermined condition, establishing an audio communication connection between the first communication device and the second communication device according to the communication quality, and performing an audio communication data transmission.

The predetermined condition can be set according to the particular situation. For example, the video communication data is generally bigger than the voice communication data, and thus the communication quality required for the video communication data transmission is higher than those of the voice communication data transmission. Therefore, the predetermined condition may be set by the user according to the requirement of video communication quality. When the detected communication quality is greater than or is equal to the predetermined condition, it means that the quality of a video communication connection may be ensured in the case of the current communication quality, and the video communication data transmission is able to be performed. When the detected communication quality is less than the predetermined condition, it means that the quality of a video communication connection may not be ensured in the case of the current communication quality, and then the audio communication data transmission is performed.

Furthermore, as the first communication device initiates a video communication request at first, to meet the requirement of the user, in case that the communication quality is less than the predetermined condition, a procedure of user's confirmation is included before the audio communication connection is established between the first communication device and the second communication device. Therefore, before the audio communication connection being established between the first communication device and the second communication device, the method further includes:

displaying an option of an audio communication request initiated to the second communication device; and after the user selects the option for the voice communication request, obtaining the audio communication request initiated to the second communication device;

The step of establishing the audio communication connection between the first communication device and the second communication device includes:

establishing an audio communication connection between the first communication device and the second communication device according to the obtained audio communication request.

In a preferred embodiment, after establishing a connection between the first communication device and the second communication device according to the communication quality, the method further includes:

saving communication data sent by the second communication device as the message information if the first communication device does not obtain the communication data, and playing the saved message information after the first communication device obtains the communication data.

The step of saving the communication data sent from the second communication device as message information if the first communication device does not acquire the communication data, and playing the saved message information after the communication data is acquired includes but is not limited to the two situations.

In first situation, after a video communication connection is established between the first communication device and the second communication device, if a video without a person is captured, the video information sent by the second communication device is saved as a video message information, and the saved video message information is played after a person image is captured.

In second situation, after an audio communication connection is established between the first communication device and the second communication device, if no audio signal is detected, the audio information sent by the second communication device is saved as an audio message information, and the saved audio message information is played after an audio signal is detected.

In this step, after a communication connection is established between the first communication device and the second communication device, a corresponding communication link is established between the first communication device and the second communication device, through which the first communication device and the second communication device may perform a communication data transmission. The first communication device and the second communication device may be provided themselves or connected peripherally with a video tool such as a camera, which can be used to collect video message information in a timely manner. The collected video communication information is sent to the corresponding device, and thus a video communication between the first communication device and the second communication device is implemented. Additionally, the first communication device and the second communication device may be provided themselves or connected peripherally with a microphone functioning as a voice recording, which can be used to collect audio message information in a timely manner. The collected audio communication information is sent to the corresponding device, and thus an audio communication between the first communication device and the second communication device is implemented. Furthermore, an information input device may be provided to collect text information or image information and so on in a timely manner.

Furthermore, when a video communication is performed between the first communication device and the second communication device, the first communication device may interrupt a current video communication at anytime, and leaves a video message or an audio message. The particular way is the same as the way for collecting message information in the above-mentioned Step 203, which is not described herein. The user is allowed to switch among any mode of video communication, video message, audio message, text message and image message and so on, by collecting the message information and sending the message information to the second communication device when a video communication is established between the first communication device and the second communication device. Thus, a convenient communication choice is provided to the user.

It is noted that either the first communication device or the second communication device is able to initiate a video communication request and establish a video communication connection with a corresponding communication device. In a particular implementation, the first communication device and the second communication device may be a device with an operation system, such as smart TV, smart phone, notebook computer, tablet computer; or may be the other device rather than the above-mentioned devices. The first communication device and the second communication device are not particularly limited in the embodiment of the disclosure. Specifically, because the method according to the embodiment of the disclosure is suitable for a video communication, the first communication device and the second communication device provided with large screen displays may provide a better visual effect for the user of the video communication.

According to the method according to the embodiment of the present disclosure, a first communication device sends a video communication request to a second communication device, and the message information collected according to a first response identifier is transmitted to the second communication device in the case where the first response identifier is received which is used for identifying that the first communication device fails to communicate to the second communication device in response to the video communication request. Therefore, the first communication device is still capable of continuously sending the message information to the second communication device in the case where the first communication device cannot perform a video communication with the second communication device. Thus, a quick and convenient selection among a variety of communication ways such as video communication, a video message and an audio message is achieved and faster communication service is provided for the user.

Third Embodiment

Figure 4:
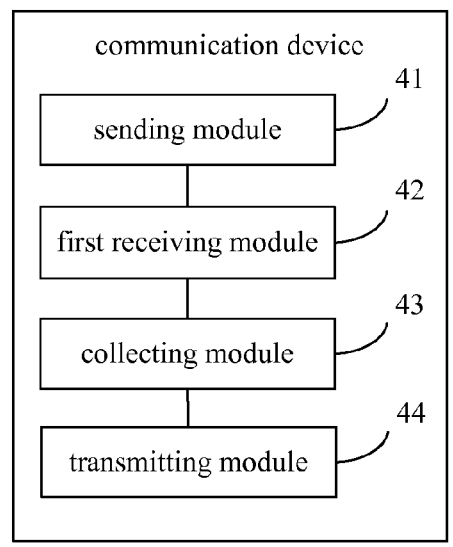
FIG. 4 is a schematic diagram of a structure of a communication device according to a third embodiment of the disclosure.

The embodiment of the present disclosure provides a communication device which is adapted to perform the data processing method according to the first embodiment and the second embodiment described above. Referring to FIG. 4, the device includes: a sending module 41, a first receiving module 42, a collecting module 43 and a transmitting module 44.

The sending module 41 is adapted to send a video communication request to the second communication device.

The first receiving module 42 is adapted to receive a first response identifier corresponding to the video communication request, wherein the first response identifier is adapted to identify that the first communication device fails to communicate with the second communication device in response to the video communication request.

The collecting module 43 is adapted to collect message information according to the first response identifier.

The transmitting module 44 is adapted to transmit the message information to the second communication device, wherein the type of the message information is one of video message information, audio message information, text message information, and picture message information.

In a preferred embodiment, the first response identifier received by the first receiving module 42 is adapted to identify that the video communication request is not successfully sent to the second communication device, that the first communication device does not receive an acceptance response to the video communication request from the second communication device in a predetermined period, or that the first communication device receives a rejection response to the video communication request from the second communication device.

In a preferred embodiment, at least two types of cases where the first communication device fails to communicate with the second communication device in response to the video communication request correspond to different values of the first response identifier.

The collecting module 43 is adapted to collect the message information in a first way in the case where the value of the first response identifier is a first value, and collect the message information in a second way in the case where the value of the response identifier is a second value. The first way is different from the second way.

In a preferred embodiment, the first way and the second way, in which the message information is collected by the collecting module 43, are different in: a collecting parameter and/or a message information parameter.

In a preferred embodiment, a first type of the case where the first communication device fails to communicate with the second communication device in response to the video communication request is that the first communication device does not receive an acceptance response to the video communication request from the second communication device in a predetermined period. A second type of the case where the first communication device fails to communicate with the second communication device in response to the video communication request is that the first communication device receives a rejection response to the video communication request from the second communication device.

The message information collected in the two types of the cases where the first communication device fails to communicate with the second communication device in response to the video communication request has the same type, and the times for recording the message information collected in the two types are different.

Alternatively, the message information collected in the two types of the cases where the first communication device fails to communicate with the second communication device in response to the video communication request has a different type, the message information collected in the second type of the case where the first communication device fails to communicate with the second communication device in response to the video communication request corresponds to a first output region when being played, the message information collected in the first type of the case where the first communication device fails to communicate with the second communication device in response to the video communication request corresponds to a second output region when being played. The first output region is smaller than the second output region.

In a preferred embodiment, a first type of the case where the first communication device fails to communicate with the second communication device in response to the video communication request is that the first communication device does not receive an acceptance response to the video communication request from the second communication device in a predetermined period or that the first communication device receives a rejection response to the video communication request from the second communication device. A second type of the case where the first communication device fails to communicate with the second communication device in response to the video communication request is that the video communication request is not successfully sent to the second communication device.

The sending module 41 is adapted to send the video communication request to the second communication device by using a first application.

The collecting module 43 is adapted to collect the message information by using the first application, the transmission module 44 is adapted to transmit the message information to the second communication device, in the case of the first type of the case where the first communication device fails to communicate with the second communication device in response to the video communication request.

The collecting module 43 is adapted to collect the message information by using a second application, the transmission module 44 is adapted to transmit the message information to the second communication device, in the case of the second type of the case where the first communication device fails to communicate with the second communication device in response to the video communication request.

The first application is different from the second application.

In a preferred embodiment, the collecting module 43 is adapted to collect the message information in a timely manner according to the first response identifier, generate a data file from the message information. The transmission module 44 is adapted to transmit the data file to the second communication device.

Alternatively, the collecting module 43 is adapted to collect the message information in a timely manner according to the first response identifier. The transmission module 44 is adapted to directly transmit the message information to the second communication device, and then the second communication device generates a data file from the message information.

In a preferred embodiment, the device further includes: a second receiving module, a detection module, and a data transmission module.

The second receiving module is adapted to receive a second response identifier corresponding to the video communication request. The second response identifier is adapted to identify that the first communication device succeeds to communicate with the second communication device in response to the video communication request.

The detection module is adapted to detect a communication quality of a network with which the communication device is located according to the second response identifier.

The data transmission module is adapted to establish a connection between the first communication device and the second communication device according to the communication quality and perform a communication data transmission.

In a preferred embodiment, the data transmission module is adapted to establish a video communication connection between the first communication device and the second communication device, and transmit video communication data in the case where it is detected that the communication quality is greater than or equal to a preset condition; and establish an audio communication connection with the second communication device and transmit audio communication data in the case where it is detected that the communication quality is less than the preset condition.

In a preferred embodiment, the device further includes: a display module, an obtaining module, and a data transmission module.

The display module is adapted to display an option of an audio communication request initiated to the second communication device.

The obtaining module is adapted to obtain the audio communication request initiated to the second communication device after a user selects the option of the audio communication request.

The data transmission module is adapted to establish the audio communication connection between the first communication device and the second communication device according to the obtained audio communication request.

In a preferred embodiment, the device further includes: a saving module and a playing module.

The saving module is adapted to save communication data sent by the second communication device as message information if the first communication device does not obtain the communication data.

The playing module is adapted to play the saved message information after the first communication device obtains the communication data.

In summary, the device according to the embodiment of the present disclosure sends a video communication request to a second communication device, and sends to the second communication device the message information collected according to a first response identifier in the case where the first response identifier for identifying that the first communication device fails to communicate with the second communication device in response to the video communication request is received. Therefore, the first communication device is still capable of continuously sending the message information to the second communication device, when the first communication device cannot perform a video communication with the second communication device. Thus, a quick and convenient selection among a variety of communication ways such as video communication, a video message and an audio message is achieved and faster communication service is provided for the user.

It should be noted that the division of various functional modules described above is illustrated as an example when the communication device according to the above-mentioned embodiment performs data processing. In practice, the function described above may be completed by different functional modules as necessary. That is, the internal structure of the communication device is divided into different functional modules to accomplish all or part of the function described above. Furthermore, the communication device according to the above-mentioned embodiment belongs to the same disclosure concept with the embodiments for the data processing method, and the specific implementation of the communication device is detailed in the method embodiment, which is not repeated any more herein.

The serial number of the above-mentioned embodiments of the present disclosure is for description only and does not represent typify the embodiments of good or bad.

It can be understood by those skilled in the art that all or some of the processes for implementing the above-mentioned embodiments can be implemented by hardware, also can be implemented by instructing related hardware using a computer program which can be stored in a computer readable storage medium. The above-mentioned storage medium may include a Read-Only Memory (ROM), a magnetic disk, or an optical disk and the like.

What is described above is only the preferable embodiments of the present disclosure and are not intended to limit the present disclosure. Any changes, equivalent substitutions, improvements and so on made within the spirit and principles of the present disclosure are all contained in the scope of protection of the present disclosure.

What is claimed is:

1. A data processing method, applied to a first communication device, wherein the method comprises:
    sending, by the first communication device, a video communication request to a second communication device;
    receiving a first response identifier corresponding to the video communication request, wherein the first response identifier is adapted to identify that the first communication device fails to communicate with the second communication device in response to the video communication request; and
    collecting message information input by a user according to the first response identifier and transmitting the message information to the second communication device;
    wherein a type of the message information is one of video message information, audio, a text message information and picture message information,
    wherein a first value of the first response identifier corresponds to a first type of case where the first communication device fails to communicate with the second communication device,
    wherein a second value of the first response identifier corresponds to a second type of case where the first communication device fails to communicate with the second communication device,
    wherein the first value is different than the second value, and
    wherein the collecting message information according to the first response identifier comprises:
        collecting the message information in a first way in the case where the value of the first response identifier is the first value; and
        collecting the message information in a second way in the case where the value of the first response identifier is the second value,
        wherein the first way is different than the second way.

2. The method according to claim 1, wherein the first response identifier is adapted to identify that the first communication device fails to communicate with the second communication device in response to the video communication request, comprises:
    the first response identifier is adapted to identify that the video communication request is not successfully sent to the second communication device, the first communication device does not receive an acceptance response to the video communication request from the second communication device in a predetermined period, or the first communication device receives a rejection response to the video communication request from the second communication device.

3. The method according to claim 1, wherein the first way and the second way is different in:
    a collecting parameter and/or a message information parameter.

4. The method according to claim 1, wherein the first type of the case where the first communication device fails to communicate with the second communication device in response to the video communication request is that the first communication device does not receive an acceptance response to the video communication request from the second communication device in a predetermined period, the second type of the case where the first communication device fails to communicate with the second communication device in response to the video communication request is that the first communication device receives a rejection response to the video communication request from the second communication device;
    the message information collected in the two types of the cases where the first communication device fails to communicate with the second communication device in response to the video communication request has the same type, and is collected by the first communication device with different duration; or
    the message information collected in the two types of the cases where the first communication device fails to communicate with the second communication device in response to the video communication request has a different type, the message information collected in the second type of the case where the first communication device fails to communicate with the second communication device in response to the video communication request corresponds to a first output region when being played, and the message information collected in the first type of the case where the first communication device fails to communicate with the second communication device in response to the video communication request corresponds to a second output region when being played, wherein the first output region is smaller than the second output region.

5. The method according to claim 1, wherein the first type of the case where the first communication device fails to communicate with the second communication device in response to the video communication request is that the first communication device does not receive an acceptance response to the video communication request from the second communication device in a predetermined period, or that the first communication device receives a rejection response to the video communication request from the second communication device; the second type of the case where the first communication device fails to communicate with the second communication device in response to the video communication request is that the video communication request is not successfully sent to the second communication device;

the sending, by the first communication device, a video communication request to a second communication device comprises:
sending, by the first communication device, the video communication request to the second communication device by using a first application;
the collecting message information according to the first response identifier and transmitting the message information to the second communication device comprises:
collecting the message information by using the first application and transmitting the message information to the second communication device, in the case of the first type of the case where the first communication device fails to communicate with the second communication device in response to the video communication request; and
collecting the message information by using a second application and transmitting the message information to the second communication device, in the case of the second type of the case where the first communication device fails to communicate with the second communication device in response to the video communication request;
wherein the first application is different from the second application.

6. The method according to claim 1, wherein the collecting message information according to the first response identifier and transmitting the message information to the second communication device comprises:
collecting the message information in a timely manner according to the first response identifier, generating a data file from the message information and transmitting the data file to the second communication device; or
collecting the message information in a timely manner according to the first response identifier and directly transmitting the message information to the second communication device, wherein the second communication device generates a data file from the message information.

7. The method according to claim 1, wherein after the sending, by the first communication device, a video communication request to a second communication device, the method further comprises:
receiving a second response identifier corresponding to the video communication request, wherein the second response identifier is adapted to identify that the first communication device succeeds to communicate with the second communication device in response to the video communication request; and
detecting a communication quality of a network with the first communication device according to the second response identifier, establishing a connection between the first communication device and the second communication device according to the communication quality and performing a communication data transmission.

8. The method according to claim 7, wherein the establishing of a connection between the first communication device and the second communication device is according to the communication quality and performing a communication data transmission comprises:
establishing a video communication connection between the first communication device and the second communication device and transmitting video communication data, in a case where it is detected that the communication quality is greater than or equal to a preset condition; and
establishing an audio communication connection between the first communication device and the second communication device and transmitting audio communication data, in a case where it is detected that the communication quality is less than the preset condition.

9. The method according to claim 8, wherein before the establishing an audio communication connection between the first communication device and the second communication device, the method further comprises:
displaying an option of an audio communication request initiated to the second communication device, and obtaining the audio communication request initiated to the second communication device after a user selects the option of the audio communication request;
the establishing an audio communication connection with the second communication device comprises:
establishing the audio communication connection between the first communication device and the second communication device according to the obtained audio communication request.

10. The method according to claim 7, wherein after the establishing a connection between the first communication device and the second communication device according to the communication quality, the method further comprises:
saving communication data sent by the second communication device as the message information if the first communication device does not obtain a video comprising a person, or if the first communication device does not detect an audio signal; and
playing the saved message information after the first communication device obtains the video comprising the person or detects the audio signal.

11. A communication device, comprising:
a sending module adapted to send a video communication request to a second communication device;
a first receiving module adapted to receive a first response identifier corresponding to the video communication request, wherein the first response identifier is adapted to identify that the first communication device fails to communicate with the second communication device in response to the video communication request;
a collecting module adapted to collect message information according to the first response identifier; and
a transmission module adapted to transmit the message information input by a user to the second communication device; wherein a type of the message information is one of video message information, audio message information, text message information and picture message information,
wherein a first value of the first response identifier corresponds to a first type of case where the first communication device fails to communicate with the second communication device,
wherein a second value of the first response identifier corresponds to a second type of case where the first communication device fails to communicate with the second communication device,
wherein the first value is different than the second value, and
the collecting module is adapted to:
collect the message information in a first way in the case where the value of the first response identifier is the first value; and
collect the message information in a second way in the case where the value of the first response identifier is the second value, wherein the first way is different from the second way are different in: a collecting parameter and/or a message information parameter.

12. The device according to claim 11, wherein the first response identifier received by the first receiving module is adapted to identify that the video communication request is not successfully sent to the second communication device, that the first communication device does not receive an acceptance response to the video communication request from the second communication device in a predetermined period or that the first communication device receives a rejection response to the video communication request from the second communication device.

13. The device according to claim 11, wherein the first type of the case where the first communication device fails to communicate with the second communication device in response to the video communication request is that the first communication device does not receive an acceptance response to the video communication request from the second communication device in a predetermined period, and the second type of the case where the first communication device fails to communicate with the second communication device in response to the video communication request is that the first communication device receives a rejection response to the video communication request from the second communication device;
the message information collected in the two types of the cases where the first communication device fails to communicate with the second communication device in response to the video communication request has the same type, and is collected by the first communication device with different duration; or
the message information collected in the two types of the cases where the first communication device fails to communicate with the second communication device in response to the video communication request has a different type, the message information collected in the second type of the case where the first communication device fails to communicate with the second communication device in response to the video communication request corresponds to a first output region when being played, the message information collected in the first type of the case where the first communication device fails to communicate with the second communication device in response to the video communication request corresponds to a second output region when being played, and the first output region is smaller than the second output region.

14. The device according to claim 11, wherein the first type of the case where the first communication device fails to communicate with the second communication device in response to the video communication request is that the first communication device does not receive an acceptance response to the video communication request from the second communication device in a predetermined period, or that the first communication device receives a rejection response to the video communication request from the second communication device; and the second type of the case where the first communication device fails to communicate with the second communication device in response to the video communication request is that the video communication request is not successfully sent to the second communication device;
the sending module is adapted to send the video communication request to the second communication device by using a first application;

the collecting module is adapted to send the video communication by using the first application, the transmission module is adapted to transmit the message information to the second communication device, in the case of the first type of the case where the first communication device fails to communicate with the second communication device in response to the video communication request; and
the collecting module is adapted to collect the message information by using a second application, the transmission module is adapted to transmit the message information to the second communication device, in the case of the second type of the case where the first communication device fails to communicate with the second communication device in response to the video communication request;
wherein the first application is different from the second application.

15. The device according to claim 11, wherein the collecting module is adapted to collect the message information in a timely manner according to the first response identifier, generate a data file from the message information; and the transmission module is adapted to transmit the data file to the second communication device; or
the collecting module is adapted to collect the message information in a timely manner according to the first response identifier, and the transmission module is adapted to directly transmit the message information to the second communication device, wherein the second communication device generates a data file from the message information.

16. The device according to claim 11, wherein the device further comprises:
a second receiving module adapted to receive a second response identifier corresponding to the video communication request, wherein the second response identifier is adapted to identify that the first communication device succeeds to communicate with the second communication device in response to the video communication request;
a detection module adapted to detect a communication quality of a network with the first communication device according to the second response identifier; and
a data transmission module adapted to establish a connection between the first communication device and the second communication device according to the communication quality and transmit communication data.

17. The device according to claim 16, wherein the data transmission module is adapted to establish a video communication connection between the first communication device and the second communication device and transmit video communication data in the case where it is detected that the communication quality is greater than or equal to a preset condition; and establish an audio communication connection between the first communication device and the second communication device and transmit audio communication data in the case where it is detected that the communication quality is less than the preset condition,
wherein the device further comprises:
a display module adapted to display an option of an audio communication request initiated to the second communication device;
an obtaining module adapted to obtain the audio communication request initiated to the second communication device after a user selects the option of the audio communication request; and the data transmission module adapted to establish the audio communication connection between the first communication device and the second communication device according to the obtained audio communication request.

18. The device according to claim 16, wherein the device further comprises:
a saving module adapted to save communication data sent by the second communication device as the message information if the first communication device does not obtain a video comprising a person, or if the first communication device does not detect an audio signal; and
a playing module adapted to play the saved message information after the first communication device obtains the video comprising the person or detects the audio signal.

* * * * *